(12) United States Patent
Son et al.

(10) Patent No.: US 9,812,164 B2
(45) Date of Patent: *Nov. 7, 2017

(54) READ HEAD CHARACTERISTIC PRE-DETECTION

(71) Applicant: Seagate Technology LLC, Cupertino, CA (US)

(72) Inventors: Mingyeong Son, Gyeonggi-do (KR); Seungyoul Jeong, Gyeonggi-do (KR); Man Sik Shim, Gyeonggi-do (KR); Woo Chan Kim, Gyeonggi-do (KR)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/415,060

(22) Filed: Jan. 25, 2017

(65) Prior Publication Data

US 2017/0133052 A1    May 11, 2017

Related U.S. Application Data

(63) Continuation of application No. 14/932,140, filed on Nov. 4, 2015, now Pat. No. 9,589,592.

(51) Int. Cl.
| | |
|---|---|
| *G11B 21/02* | (2006.01) |
| *G11B 20/10* | (2006.01) |
| *G11B 5/02* | (2006.01) |
| *G11B 20/18* | (2006.01) |

(52) U.S. Cl.
CPC ........ *G11B 20/10009* (2013.01); *G11B 5/02* (2013.01); *G11B 20/1816* (2013.01)

(58) Field of Classification Search
CPC ..... G11B 5/6005; G11B 5/59633; G11B 5/54; G11B 5/59677; G11B 27/36; G11B 5/012; G11B 20/18; G11B 20/10009; G11B 5/09; G11B 2220/90
USPC ................. 360/59, 75, 77.02, 25, 31, 39, 53
See application file for complete search history.

(56) References Cited

U.S. PATENT DOCUMENTS

| | | | |
|---|---|---|---|
| 6,142,006 A | 11/2000 | Marchon et al. | |
| 6,188,538 B1 | 2/2001 | Mills et al. | |
| 7,062,698 B2 | 6/2006 | Yang | |
| 7,212,371 B2 * | 5/2007 | Abe ...................... | G11B 21/12 360/77.02 |
| 7,483,233 B2 * | 1/2009 | Kim ..................... | G11B 21/12 360/75 |
| 7,661,187 B2 | 2/2010 | Taniguchi et al. | |
| 8,054,567 B2 | 11/2011 | Mochizuki et al. | |
| 8,107,178 B2 | 1/2012 | Takahashi | |

(Continued)

*Primary Examiner* — Nabil Hindi
(74) *Attorney, Agent, or Firm* — Holzer Patel Drennan

(57) ABSTRACT

Implementations disclosed herein provide a method comprising applying voltage to a read head during an unload state, detecting characteristic read head data, and storing the detected characteristic read head data in a buffer. In another implementation, the method further comprises performing a read retry operation in response to a read failure, reading the detected characteristic read head data from the buffer, determining if the detected characteristic read head data meets a threshold for a first predetermined criterion, performing a correction operation if the threshold for the first the first predetermined criterion is met, determining whether a media sector is read successfully, and ending the read retry operation if the media sector is read successfully.

20 Claims, 3 Drawing Sheets

(56) References Cited

U.S. PATENT DOCUMENTS 8,755,136 B1 6/2014 Ng et al.
8,934,185 B2 1/2015 Hur et al.
9,076,473 B1 7/2015 Liu et al.

* cited by examiner

READ HEAD CHARACTERISTIC PRE-DETECTION

PRIORITY CLAIM

The present application is a continuation application of U.S. patent application Ser. No. 14/932,140, filed Nov. 4, 2015, and titled "Read Head Characteristic Pre-Detection" and expected to issue on Mar. 7, 2017 as U.S. Pat. No. 9,589,592 which is hereby incorporated by reference in its entirety.

BACKGROUND

Disc drives are data storage devices that store digital data in magnetic form on a rotating storage medium called a disc. Each surface of a disc may be divided into several hundred thousand tracks arranged in tightly-packed concentric circles. Each track is further broken down into sectors that are arranged sequentially. That is, each sector on a track is adjacent to the previous and next sector. Generally, each of the surfaces in a disc drive has a recording head for reading and writing data to a sector with one head per surface of the disc. Data is accessed by moving the heads from the inner to outer part (and vice versa) of the disc drive by an actuator assembly. During a data access operation, one of the heads is positioned over the desired location of a sector on the disc in order to access (i.e., read or write) the sector.

SUMMARY

Implementations disclosed herein provide a method comprising applying voltage to a read head during an unload state, detecting characteristic read head data, and storing the detected characteristic read head data in a buffer. In another implementation, the method further comprises performing a read retry operation in response to a read failure, reading the detected characteristic read head data from the buffer, determining if the detected characteristic read head data meets a threshold for a first predetermined criterion, performing a correction operation if the threshold for the first predetermined criterion is met, determining whether a media sector is read successfully, and ending the read retry operation if the media sector is read successfully.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations as further illustrated in the accompanying drawings and defined in the appended claims.

BRIEF DESCRIPTIONS OF THE DRAWINGS

DETAILED DESCRIPTION

Figure 1:
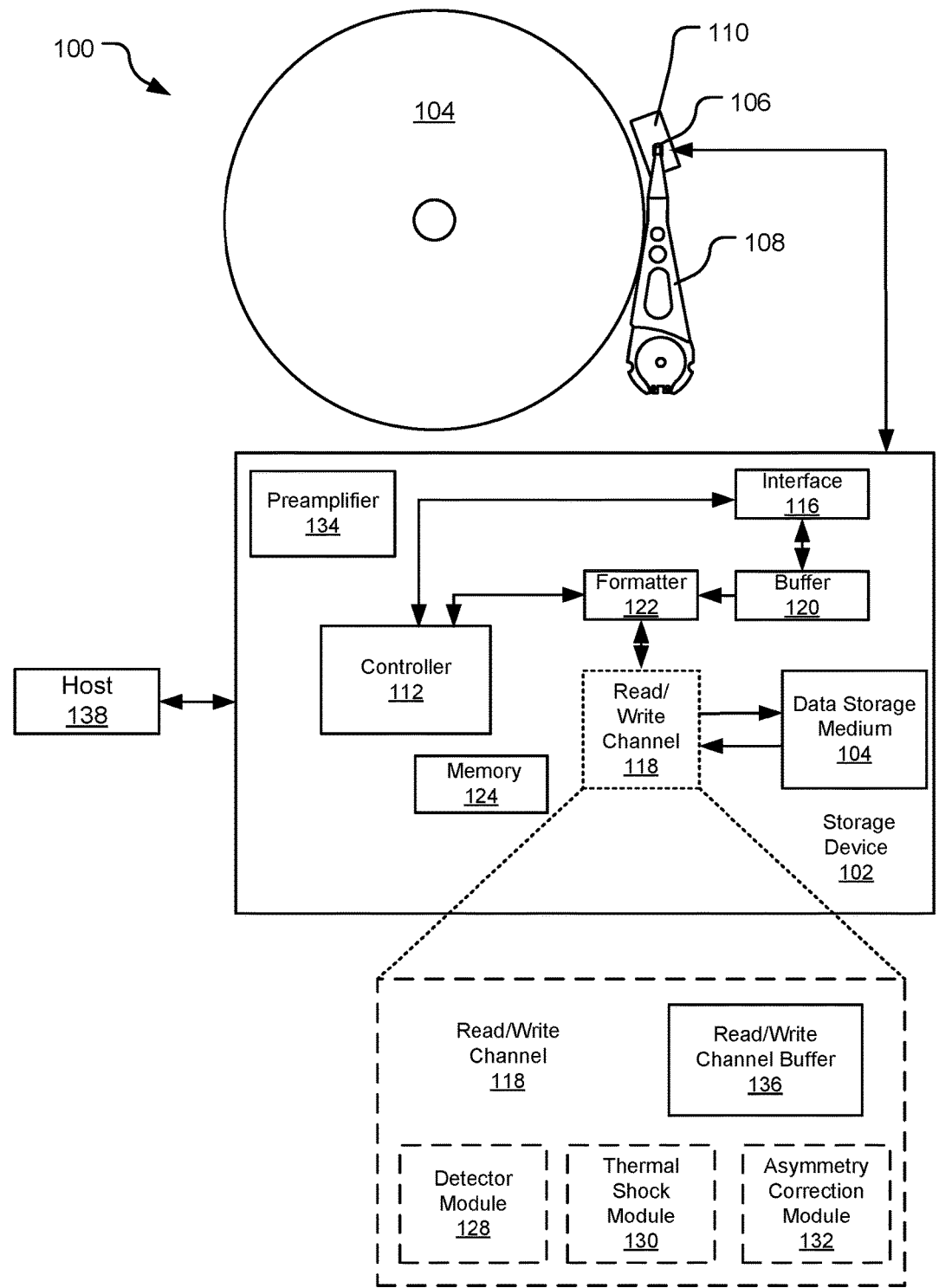
FIG. 1 illustrates a block diagram of an example data storage device system.

A read head in a hard-disk drive requires accurate alignment and stability on storage tracks on the disk to ensure proper reading of information. Over time, a read head can degrade and exhibit instability or asymmetry, either in the burn-in process or in the field (user environment) of the device. Instability or asymmetry in the read head may cause increasing and/or fluctuating bit error rates and channel statistical measurements. As a result, there can be decreased reliability and performance of the device and may eventually lead to device failure. Read head instability or asymmetry in a hard-disk drive or other storage device may be detected and the head recovered by performing corrective operations, such as thermal shock operations or asymmetry correction operations.

There can be drawbacks to methods of detecting and correcting read head characteristics. During read and write operations, while detecting read head characteristics, inaccuracies regarding measurements of instability or asymmetry can occur. If by error a thermal shock, for example, is applied to a normal read head having no head instability, degradation of the head can be accelerated.

Additionally, during read retry operations, correction operations such as thermal shock operations and asymmetry correction operations can be performed to recover a degraded characteristic of a read head. Such correction operations can lead to longer retry operations. Specifically, thermal shock operations and asymmetry correction operations occur later in the read retry operations, necessitating the longer read retry operation if corrective head measures are required.

The proposed method includes applying voltage or current bias to a read head during an unload or parking state to detect varying read head signal so that detection accuracy of head characteristic change can be improved, and a corrective operation can be performed during a read retry operation based on the detected head characteristic to reduce unnecessary physical read operations, thereby improving overall read performance.

For purposes of the disclosed technology, an unload state or a parking state is where a channel and a preamplifier are turned off after a read/write operation, the read head is not used, and power saving occurs. During an unload state, if voltage or current bias is applied to a preamplifier, any finite change of a read sensor can be more directly and clearly observed because there is no channel influence. For example, in terms of peak-to-peak amplitude in an unload or parking state, a normal read head has a voltage level of approximately 80 mV whereas a head with instability has a voltage level of more than 110 mV. An asymmetrical head can be more accurately determined by checking the value of a one-sided peak amplitude since a bias value is biased to one side in the asymmetrical head. Thus, the disclosed method can detect head instability and asymmetry characteristics of the read head more accurately than other detection operations.

FIG. 1 illustrates a diagram of an example data storage device system 100, showing the main functional circuits used on a storage device 102 (e.g., an SMR HDD, an SMR SSHD, an object storage device, etc.) to control the operation of the data storage device 102. The system 100 includes a host device 138 or other components (e.g., a server computer, personal computer ("PC"), laptop, tablet, game console, set-top box, or any other electronics device) that can be communicatively coupled to the data storage device system 100 to store and retrieve data from the storage device 102.

The storage device 102 may include magnetic media comprising a data storage medium (e.g., at least one platter or a disc 104). The storage device 102 includes at least one read/write head 106 located adjacent to a surface of each disc 104. The read/write head 106 may read information from the disk 104 by sensing a magnetic field formed on portions of the surface of the disk, and may write information to the disk by magnetizing a portion of the surface of the disk. The read/write head 106 may be located at the distal end of an arm 108 that rotates in order to reposition the read/write head 106.

The data storage device system 100 may further comprise a dock or ramp 110. The ramp 110 may provide a location for safely unloading or parking the read/write head 106 away from the surface of the disc 104 or placing when not in use. In some embodiments, the ramp 110 may be located in other areas off the disc 104, such as at the inner off-disk portion. Alternatively, in some embodiments, instead of an off-disk ramp 110, an on-disk landing zone located at either the inner or outer diameter of the disc 104 where no user data is stored, may be utilized.

The data storage device 102 also includes a controller 112. Control communication paths are provided between the host device 138 and the controller 112. The controller 112 provides communication and control for the data storage device 102 in conjunction with programming for the controller 112 stored in memory 124 (e.g., RAM, ROM, etc.). The memory 124 may comprise a non-volatile memory, such as read-only memory ("ROM") and/or FLASH memory, and a random-access memory ("RAM") (e.g., dynamic random access memory ("DRAM") or synchronous dynamic random access memory. ("SDRAM")). For example, the non-volatile memory and/or the RAM may store a firmware that comprises commands and data necessary for performing the operations of the storage device 102. According to some embodiments, the non-volatile memory and/or the RAM may store processor-executable instructions that, when executed by the processor, perform the operations for recovering an instable head in the storage device 102.

Data is transferred between the host device 138 and the data storage device 104 by way of a disc drive interface 116, a buffer 120, and a formatter 122. The buffer 120 is used to facilitate high-speed data transfer between the host device 138 and the data storage device 104. Data to be written to a data storage medium 104 (e.g., a disc) is passed from the host device 138 to the interface 116 through the buffer 120, then further through the formatter 122, and then to the read/write channel 118, which encodes and serializes the data and provides the requisite write current signals to the heads (not shown). To retrieve data that has been previously stored by the data storage device 102, read signals are generated by the heads and provided to the read/write channel 118, which performs decoding and outputs the retrieved data through the formatter 122 and buffer 120, to the interface 116 for subsequent transfer to the host device 138.

During the disclosed read head characteristic detection methods, a voltage or current bias is applied to a read head during an unload state. A detector module 128, which may be located in the read/write channel 118, detects read head signals during the unload state. The read/write channel 118, which converts data between the digital signals from the read/write head 106 for reading and writing data to the surface of the disk 104, processes analog signals to and from the read/write head 106 through the preamplifier 134. In the unload state, head signals indicating characteristics (e.g., peak-to-peak amplitude, one-sided peak amplitude, or average amplitude) can be monitored within a certain time interval and a flag can be counted every time the corresponding value is greater than a threshold.

By analyzing peaks in varying read head signals through peak detection methods, a decision block can analyze values and determine whether the head has asymmetry or instability characteristics and store a value defining the result in a buffer (e.g., a read/write channel buffer 136) in the read/write channel 118.

Once values for detected head characteristics are stored in the read/write channel buffer 136, operations for correction of the detected read head characteristics can occur during a read retry operation.

A read retry operation is performed in response to a read failure. The detected characteristic head data from the read/write channel buffer 136 is read. If the detected characteristic read head data meets a threshold for a first predetermined criterion for a measured signal value for asymmetry, an asymmetry correction operation occurs via an asymmetry correction module 132 in the read/write channel 118. Or, if a first predetermined criterion is determined for a measured signal value for thermal shock, a thermal shock operation can occur via a thermal shock module 130 in the read/write channel 118. If the first predetermined criterion threshold is not met for either asymmetry or thermal shock, then another read retry operation is performed.

Following an asymmetry correction operation or a thermal shock operation, it is determined whether the correction operations corrected an error. If a media sector is read successfully, the read retry operation ends. If the media sector is not read successfully, then another read retry operation is performed. In one implementation, the read retry operation may be performed according to a pre-defined retry table.

According to some embodiments, the detector module 128, the thermal shock module 130, and the asymmetry module 132 may be implemented in the controller 112 as software, hardware, or any combination of the two. Or, the detector module 128, the thermal shock module 130, and the asymmetry module 132 may be stored in the memory 124 as part of the firmware of the storage device 102 for performing the recovery methods and routines described herein. The detector module 128, the thermal shock module 130, and the asymmetry module 132 may alternatively or additionally be stored in other computer-readable media accessible by the controller 112.

In further embodiments, he detector module 128, the thermal shock module 130, and the asymmetry module 132 may be implemented in a computing system external to and operably connected to storage device 102 such as to perform the recovery methods and routines described herein, as part of a testing of the storage device components by the manufacturer, for example. The detector module 128, the thermal shock module 130, and the asymmetry module 132 may further be stored in a memory or other computer-readable media accessible by the data storage device system 100 and be executed by a processor of the data storage device system 100.

It will be appreciated that the structure and/or functionality of the storage device 102 may be different that that illustrated in FIG. 1 and described herein. For example, the read/write channel 118, memory 124, and other components and circuitry of the storage device 102 may be integrated within a common integrated circuit package, or distributed among multiple integrated circuit packages. Similarly, the illustrated connection pathways are provided for purposes of illustration and not of limitation, and some components and/or interconnections may be omitted for purposes of clarity. It will be further appreciated that the storage device 102 may not include all of the components shown in FIG. 1, may include other components that are not explicitly shown in FIG. 1, or may utilize an architecture completely different than that shown in FIG. 1.

In addition to the non-volatile memory and/or the RAM, the data storage device system 100 may include other computer-readable media storing program modules, data structures, and other data described herein for recovering an instable head of the storage device 102. It will be appreciated by those skilled in the art that computer-readable media can be any available media that may be accessed by the controller or other computing system, including computer-readable storage media and communications media. Communications media includes transitory signals. Computer-readable storage media includes volatile and non-volatile, removable and non-removable storage media implemented in any method or technology for the non-transitory storage of information. For example, computer-readable storage media includes, but is not limited to, RAM, ROM, erasable programmable ROM ("EPROM"), electrically-erasable programmable ROM ("EEPROM"), FLASH memory or other solid-state memory technology, compact disc ROM ("CD-ROM"), digital versatile disk ("DVD"), high definition DVD ("HD-DVD"), BLU-RAY or other optical storage, magnetic cassettes, magnetic tape, magnetic disk storage or other magnetic storage devices and the like.

Figure 2:
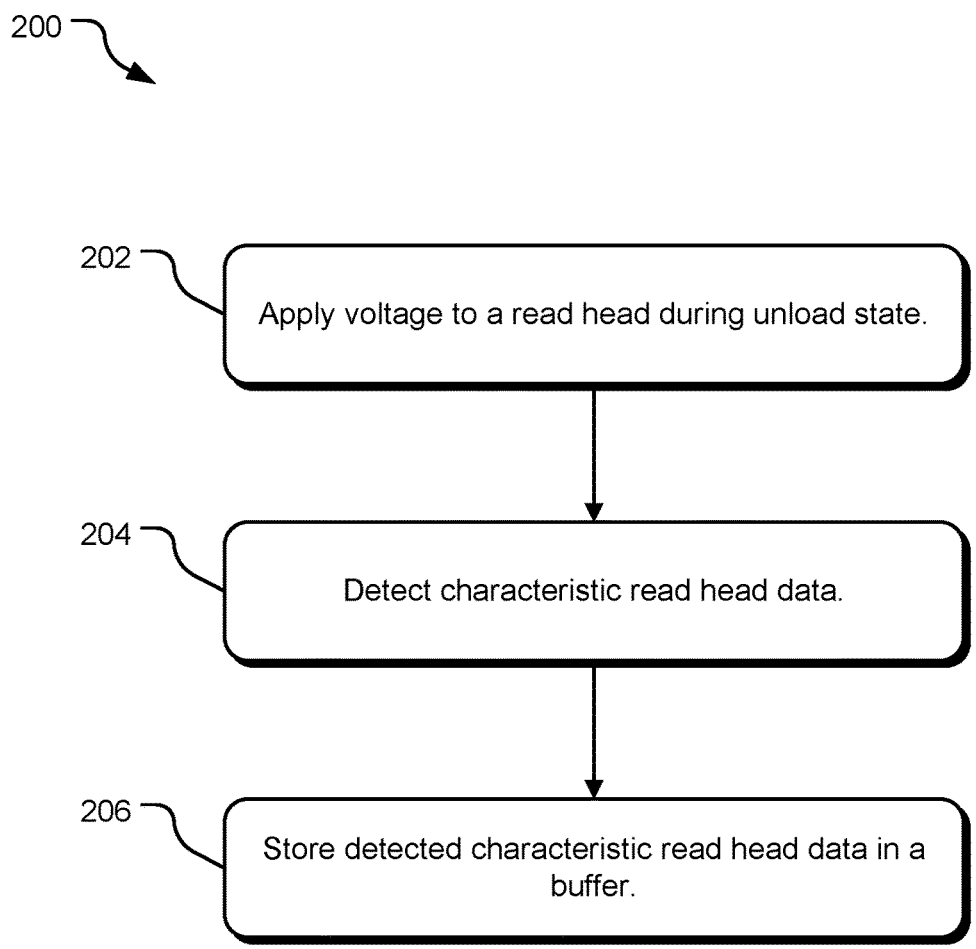
FIG. 2 illustrates a flowchart of example operations for read head characteristic detection.

FIG. 2 illustrates a flowchart of example operations for read head characteristic detection. Specifically, operations 200 include detection of varying read head signal so that detection accuracy of head characteristic change can be improved.

In an operation 202, voltage or current bias is applied to a read head during an unload state. In an operation 204, characteristic read head data is detected by a detector module with peak detection methods. The detector module detects head signals indicating characteristics (e.g., peak-to-peak amplitude, one-sided peak amplitude, or average amplitude) within a certain time interval. A flag can be counted every time the corresponding value is greater than a threshold. For example, if a head has instability, a flag can be set to 1. For example, the instability of the head maybe magnetic instability of the head, etc.

In an operation 206, the detected characteristic read head data is stored in a buffer. For example, if the head was determined to have instability, a value defining the instability result is stored in the buffer.

Figure 3:
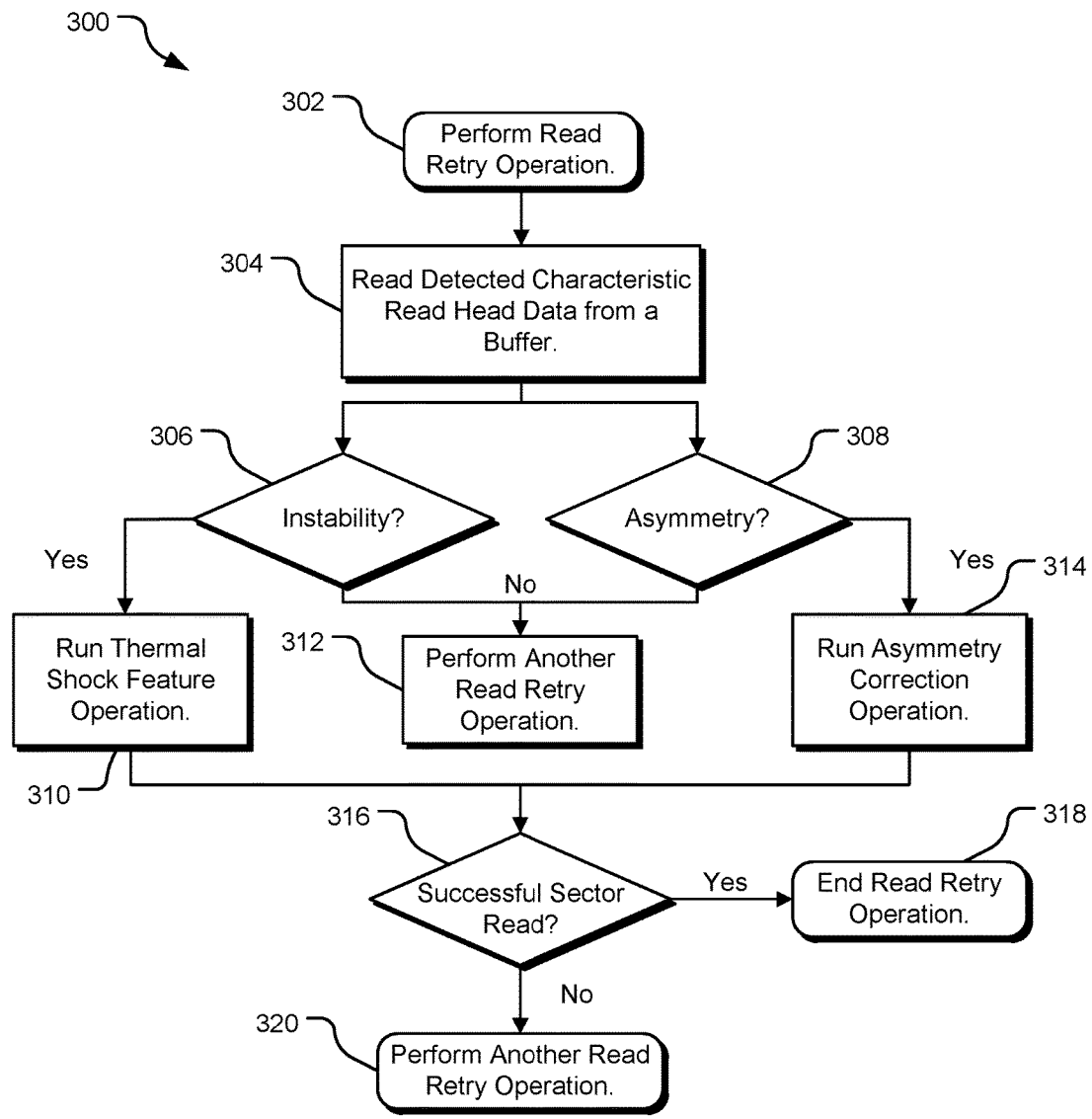
FIG. 3 illustrates a flowchart of example operations for correction of detected read head characteristics.

FIG. 3 illustrates a second flowchart of example operations for correction of detected read head characteristics. Specifically, operations 300 include performing high recovery capability during a read retry operation based on detected head characteristic change and reduce unnecessary physical read operations, thereby improving read performance.

In an operation 302, a read retry operation is performed in response to a read failure. In an operation 304, detected characteristic head data from the buffer in the read/write channel is read.

An operation 308 determines if the detected characteristic read head data meets a threshold for a first predetermined criterion for a measured signal value for asymmetry. For example, such asymmetry may be a physical or magnetic asymmetry of the read head. If the first predetermined criterion threshold is met, and a measured value indicates asymmetry, then an operation 314 performs an asymmetry correction operation. A first predetermined criterion can also be determined for a measured signal value for instability in an operation 306. If the first predetermined criterion threshold is met, and a measured value indicates instability, then an operation 310 performs a thermal shock operation.

If the first predetermined criterion threshold is not met for either asymmetry or instability, then another read retry operation 312 is performed.

An operation 316 determines whether a media sector is successfully read. If an error is corrected by either an asymmetry correction operation or a thermal shock operation, then the sector will be successfully read. An operation 318 ends the read retry operation if the media sector is successfully read. If the media sector is not successfully read at operation 318, then another read retry operation 320 is performed. The disclosed technology improves the detection accuracy of head characteristic change, and reduces unnecessary physical read operations, thereby improving overall read performance.

In addition to methods, the embodiments of the technology described herein can be implemented as logical steps in one or more computer systems. The logical operations of the present technology can be implemented (1) as a sequence of processor-implemented steps executing in one or more computer systems and/or (2) as interconnected machine or circuit modules within one or more computer systems. Implementation is a matter of choice, dependent on the performance requirements of the computer system implementing the technology. Accordingly, the logical operations of the technology described herein are referred to variously as operations, steps, objects, or modules. Furthermore, it should be understood that logical operations may be performed in any order, unless explicitly claimed otherwise or unless a specific order is inherently necessitated by the claim language.

Data storage and/or memory may be embodied by various types of storage, such as hard disc media, a storage array containing multiple storage devices, optical media, solid-state drive technology, ROM, RAM, and other technology. The operations may be implemented in firmware, software, hard-wired circuitry, gate array technology and other technologies, whether executed or assisted by a microprocessor, a microprocessor core, a microcontroller, special purpose circuitry, or other processing technologies. It should be understood that a write controller, a storage controller, data write circuitry, data read and recovery circuitry, a sorting module, and other functional modules of a data storage system may include or work in concert with a processor for processing processor-readable instructions for performing a system-implemented process.

For purposes of this description and meaning of the claims, the term "memory" means a tangible data storage device, including non-volatile memories (such as flash memory and the like) and volatile memories (such as dynamic random access memory and the like). The computer instructions either permanently or temporarily reside in the memory, along with other information such as data, virtual mappings, operating systems, applications, and the like that are accessed by a computer processor to perform the desired functionality. The term "memory" expressly does not include a transitory medium such as a carrier signal, but the computer instructions can be transferred to the memory wirelessly.

The above specification, examples, and data provide a complete description of the structure and use of example implementations of the invention. Since many implementations of the invention can be made without departing from the spirit and scope of the invention, the invention resides in the claims hereinafter appended. Furthermore, structural features of the different implementations may be combined in yet another implementation without departing from the recited claims. The implementations described above and other implementations are within the scope of the following claims.

What is claimed is:

1. A method comprising:
applying voltage to a read head during an unload state; and
detecting characteristic read head data responsive to the applied voltage.

2. The method of claim 1, further comprising:
storing the detected characteristic read head data in a buffer.

3. The method of claim 2, further comprising:
performing a read retry operation in response to a read failure;
reading the detected characteristic read head data from the buffer; and
determining if the detected characteristic read head data meets a threshold for a first predetermined criterion.

4. The method of claim 3, further comprising:
performing a correction operation responsive to meeting the threshold for the first predetermined criterion.

5. The method of claim 4, further comprising:
determining whether a media sector is read successfully; and
ending the read retry operation based on a determination of a successful media sector read.

6. The method of claim 3, further comprising performing another read retry operation responsive to not meeting the first predetermined criterion.

7. The method of claim 3, further comprising performing another read retry operation if the media sector is not read successfully.

8. A storage device, comprising:
a preamplifier configured to apply voltage to a read head during an unload state; and
a detector configured to detect characteristic read head data.

9. The storage device of claim 8, further comprising:
a controller configured to store the detected characteristic read head data in a buffer.

10. The storage device of claim 9, wherein the storage device is further configured to:
perform a read retry operation in response to a read failure;
read the detected characteristic read head data from the buffer; and
determine if the detected characteristic read head data meets a threshold for a first predetermined criterion.

11. The storage device of claim 10, wherein the storage device is further configured to:
perform a correction operation responsive to meeting the threshold for the first predetermined criterion.

12. The storage device of claim 11, wherein the storage device is further configured to:
determine whether a media sector is read successfully; and
end the read retry operation based on a determination of a successful media sector read.

13. The storage device of claim 10, wherein the first predetermined criterion is based on a measured instability value.

14. The storage device of claim 10, wherein the first predetermined criterion is based on a measured asymmetry value.

15. One or more non-transitory computer-readable storage media encoding computer-executable instructions for executing on a computer system a computer process that performs a correction operation based on a detected read head characteristic, the computer process comprising:
applying voltage to a read head during an unload state; and
detecting characteristic read head data.

16. The one or more non-transitory computer-readable storage media of claim 15, wherein the computer process further comprises storing the detected characteristic read head data in a buffer.

17. The one or more non-transitory computer-readable storage media of claim 16, wherein the computer process further comprises performing a read retry operation in response to a read failure.

18. The one or more non-transitory computer-readable storage media of claim 17, wherein the computer process further comprises:
reading the detected characteristic read head data from the buffer; and
determining if the detected characteristic read head data meets a threshold for a first predetermined criterion.

19. The one or more non-transitory computer-readable storage media of claim 18, wherein the computer process further comprises:
performing a correction operation responsive to meeting the threshold for the first predetermined criterion.

20. The one or more non-transitory computer-readable storage media of claim 19, wherein the computer process further comprises:
determining whether a media sector is read successfully; and
ending the read retry operation based on a determination of a media sector read.

* * * * *